US 8,103,446 B2

(12) United States Patent
Yokota

(10) Patent No.: US 8,103,446 B2
(45) Date of Patent: Jan. 24, 2012

(54) VEHICLE NAVIGATION APPARATUS

(75) Inventor: Yasunari Yokota, Kariya (JP)

(73) Assignee: DENSO CORPORATION, Kariya (JP)

( * ) Notice: Subject to any disclaimer, the term of this patent is extended or adjusted under 35 U.S.C. 154(b) by 758 days.

(21) Appl. No.: 12/230,040

(22) Filed: Aug. 21, 2008

(65) Prior Publication Data

US 2009/0055092 A1 Feb. 26, 2009

(30) Foreign Application Priority Data

Aug. 21, 2007 (JP) .................................. 2007-214734

(51) Int. Cl.
*G01C 21/30* (2006.01)
(52) U.S. Cl. ........ 701/208; 701/207; 701/212; 701/214; 340/995.15; 340/995.17; 340/995.22
(58) Field of Classification Search .......... 701/207–209, 701/211–214; 340/436, 990, 995.1, 995.15, 340/995.17, 995.22, 995.23, 430
See application file for complete search history.

(56) References Cited

U.S. PATENT DOCUMENTS

| 4,796,191 A | * | 1/1989 | Honey et al. | 701/217 |
| 5,323,152 A | * | 6/1994 | Morita | 340/988 |
| 5,412,573 A | * | 5/1995 | Barnea et al. | 701/211 |
| 5,796,613 A | * | 8/1998 | Kato et al. | 701/214 |
| 6,265,968 B1 | * | 7/2001 | Betzitza et al. | 340/436 |
| 6,453,235 B1 | | 9/2002 | Endo et al. | |
| 6,519,528 B2 | | 2/2003 | Endo et al. | |
| 6,640,188 B2 | | 10/2003 | Hashida | |
| 2008/0077322 A1 | | 3/2008 | Sumizawa | |

* cited by examiner

*Primary Examiner* — Gertrude Arthur Jeanglaude
(74) *Attorney, Agent, or Firm* — Posz Law Group, PLC

(57) ABSTRACT

A vehicle navigation apparatus searches a matching link within a tolerance range from a travel locus of a vehicle based on map data when the vehicle makes a turn, and the vehicle position is shifted to the matching link that is found in the search. After matching the vehicle position to the matching link, the vehicle position is returned to a pre-matching position when the vehicle is determined to have entered a facility for facilitating subsequent processing. By returning to the pre-matching position, the vehicle position can be processed and displayed accurately in the subsequent processing due to use of the vehicle position referring to the pre-matching position instead of a position after the matching control.

11 Claims, 8 Drawing Sheets

# VEHICLE NAVIGATION APPARATUS

CROSS REFERENCE TO RELATED APPLICATION

The present application is based on and claims the benefit of priority of Japanese Patent Application No. 2007-214734 filed on Aug. 21, 2007, the disclosure of which is incorporated herein by reference.

FIELD OF THE INVENTION

The present disclosure generally relates to a vehicle navigation apparatus for use in a vehicle.

BACKGROUND INFORMATION

Conventionally, a vehicle navigation apparatus detects, for the purpose of accurately displaying a current vehicle position, the current vehicle position and a white line on a road based on a captured image that captures a travel direction of a vehicle, and selects one of plural roads for matching the current vehicle position thereto based on a detection result of the white line if the current vehicle position is possibly matched to plural roads. A Japanese patent document JP-A-2005-345240 (US patent document 20080077322) discloses, for example, a navigation device configured to perform such operation.

Though the distance between intersections is an unambiguously-defined value, a travel locus of a vehicle may vary depending on a driving technique of a driver due to a lane change, a faltered driving, or due to a tolerance of a distance measurement (e.g., a change of the tire diameter) or the like, thereby leading to an un-matching between an actual travel distance and inter-intersection distance data on the map. Therefore, the current vehicle position has a predetermined tolerance range in a front and rear field and on a right and left side of the vehicle for matching control that matches the current vehicle position to a link within the tolerance range, for the purpose of accurately displaying the vehicle position when the vehicle makes a right or left turn at an intersection.

That is, as shown in FIG. 8, the matching link is searched within the tolerance range of the current vehicle position when the vehicle makes a left turn at the intersection, and the vehicle position is matched to a link (e.g., a link X in FIG. 8) that suitably matches with the current vehicle position within the tolerance range, that is, a position α is shifted to a position α' as shown in FIG. 8, for the purpose of displaying the current vehicle position without a de-railing of the position away from the road.

However, the above matching control causes a problem when the vehicle enters a facility as described in the following. That is, as shown in FIG. 9, when the vehicle makes a left turn for, for example, entering a facility such as a gas station or the like at the intersection, the current vehicle position is matched to a matching link within the tolerance range after a search of the matching link triggered by a start and an end of the turn of the vehicle based on a travel locus of the vehicle on a link that corresponds to the current vehicle position. That is, a position β is shifted to a position β' as shown in FIG. 9. In that case, the vehicle is falsely determined as making a left turn at the intersection when the vehicle is actually turning for entering the facility, and a subsequent processing is performed with reference to a position immediately after the matching control, thereby leading to a de-railing of the display of the current vehicle position away from a link when the vehicle exits from the facility.

The false determination and the problem may be resolved when a white line painted on the road is detected for the determination whether or not the vehicle has entered the facility as disclosed in the above Japanese patent document. However, the method in the above disclosure requires an imaging device for capturing an image in the traveling direction of the vehicle as well as a function for analyzing the captured image for detecting the white line in the image. That is, the problem cannot be solved without increasing the costs.

SUMMARY OF THE INVENTION

In view of the above and other problems, the present disclosure provides a navigation apparatus that accurately displays a current vehicle position without increasing a production cost of the apparatus.

The navigation apparatus of the present disclosure includes: a current position detector for detecting a current vehicle position; a travel locus calculator for calculating a vehicle travel locus based on the detected current vehicle position; a map data obtainer for obtaining map data that represents lay conditions of roads; a turn determiner for determining whether or not a vehicle has turned; a map matching unit for performing matching control; an entrance pattern obtainer for obtaining an entrance travel pattern that represents a travel pattern of the vehicle during an entrance of the vehicle into a facility; and an entrance determiner for determining whether or not the vehicle has entered the facility based on a comparison of the vehicle travel locus calculated by the travel locus calculator with the entrance travel pattern obtained by the entrance pattern obtainer.

By using the above functional units, the navigation apparatus operates in the following manner. That is, the turning of the vehicle determined by the turn determiner includes a turn start and a turn end. Then, the matching control by the map matching unit is performed under a trigger of determination by the turn determiner that the vehicle has made a turn that is defined by the turn start and the turn end, and the matching control searches a matching link for the current vehicle position detected by the current position detector within a tolerance range from the vehicle travel locus calculated by the travel locus calculator based on the map data obtained by the map data obtainer. Further, the matching control matches the current vehicle position to a position on the matching link when the matching link is found within the tolerance range. At this point, the map matching unit returns, for performing subsequent processing, an after-matching current vehicle position to a pre-matching current vehicle position after performing the matching control of the current vehicle position to the matching link when the entrance determiner determines that the vehicle has entered the facility.

Therefore, the navigation apparatus of the present disclosure can perform the subsequent processing with reference to the current vehicle position returned to the pre-matching position on the link, because the current vehicle position matched to the matching link searched and found within the tolerance range based on the vehicle travel locus is returned to the pre-matching position after the determination that the vehicle has entered the facility. As a result, the current vehicle position is accurately displayed without increasing the production cost of the vehicle due to the use of the imaging device or the like for capturing an image of the travel direction of the vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
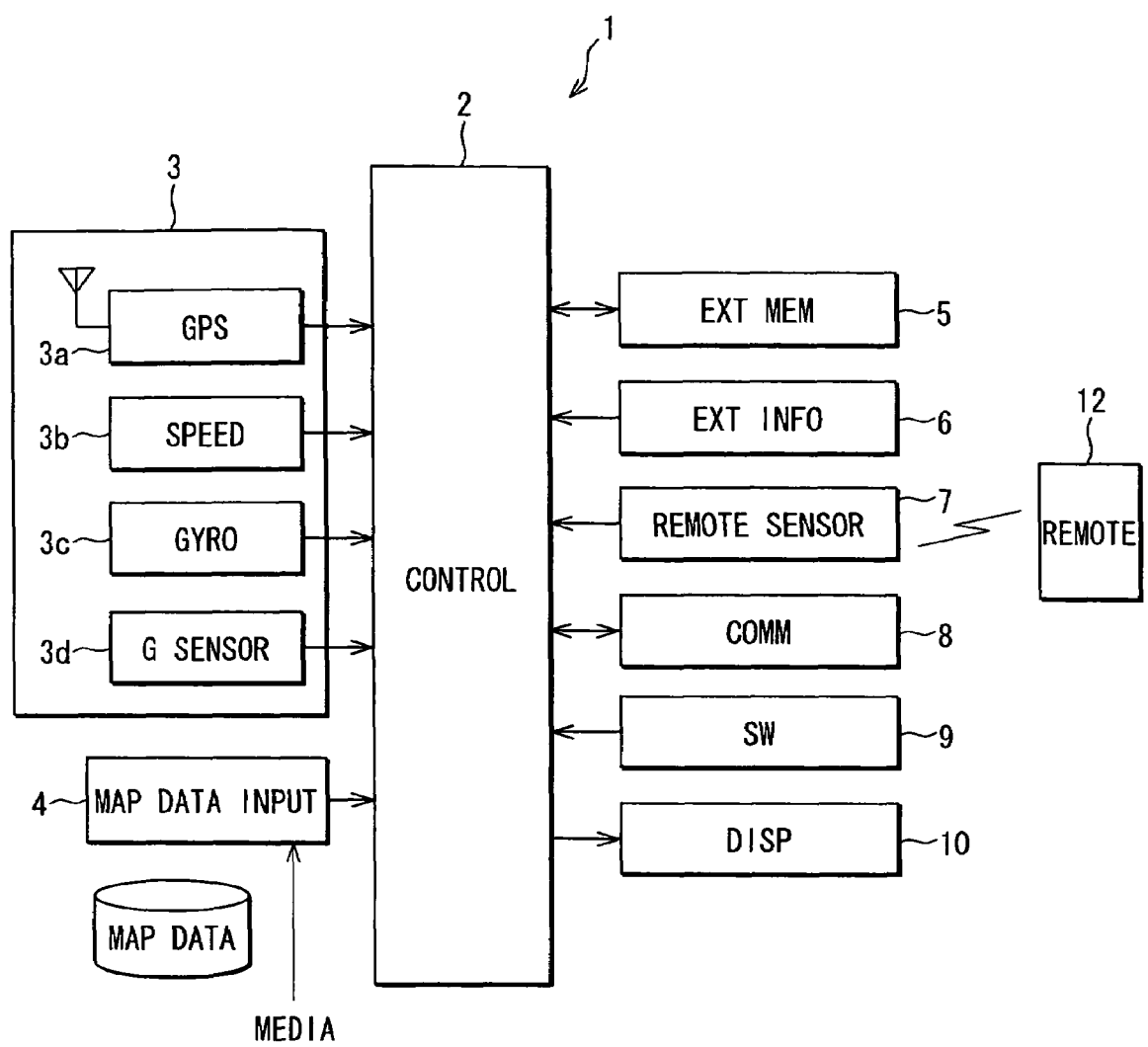
FIG. 1 shows a block diagram of a total configuration of a vehicle navigation apparatus in an embodiment of the present invention.

One embodiment of the present invention is explained referring to FIGS. 1 to 7 in the following. FIG. 1 shows a total configuration of a vehicle navigation apparatus by using a functional block chart. A vehicle navigation apparatus 1 includes a control unit 2 (a current position detector in the present invention, a travel locus calculator, a turn determiner, a map matching unit, an entrance determiner), a position sensor 3, a map data input unit 4 (a map data obtainer, an entrance pattern obtainer), an external memory 5, an external information input unit 6, a wireless remote controller sensor 7, a communications unit 8, an operation switch group 9 and a display unit 10.

The control unit 2 has a CPU, RAM, ROM and I/O bus, and executes a control program for controlling an operation of the whole navigation apparatus. The position sensor 3 has a GPS receiver 3a, a vehicle speed sensor 3b, a gyroscope 3c and a G sensor 3d, respectively having errors of different nature for mutually compensating the errors. The control unit 2 detects a current vehicle position and a vehicle travel locus by complementing the signals from each of these components in the sensor 3. In this case, the position sensor 3 needs not have all of those components if as long as it is capable of detecting the position and the travel locus in a required detection accuracy, or the position sensor 3 may be combined with additional sensors such as a steering sensor for detecting a steering angle, a wheel sensor for detecting a rotation of each of the wheels.

Figure 2:
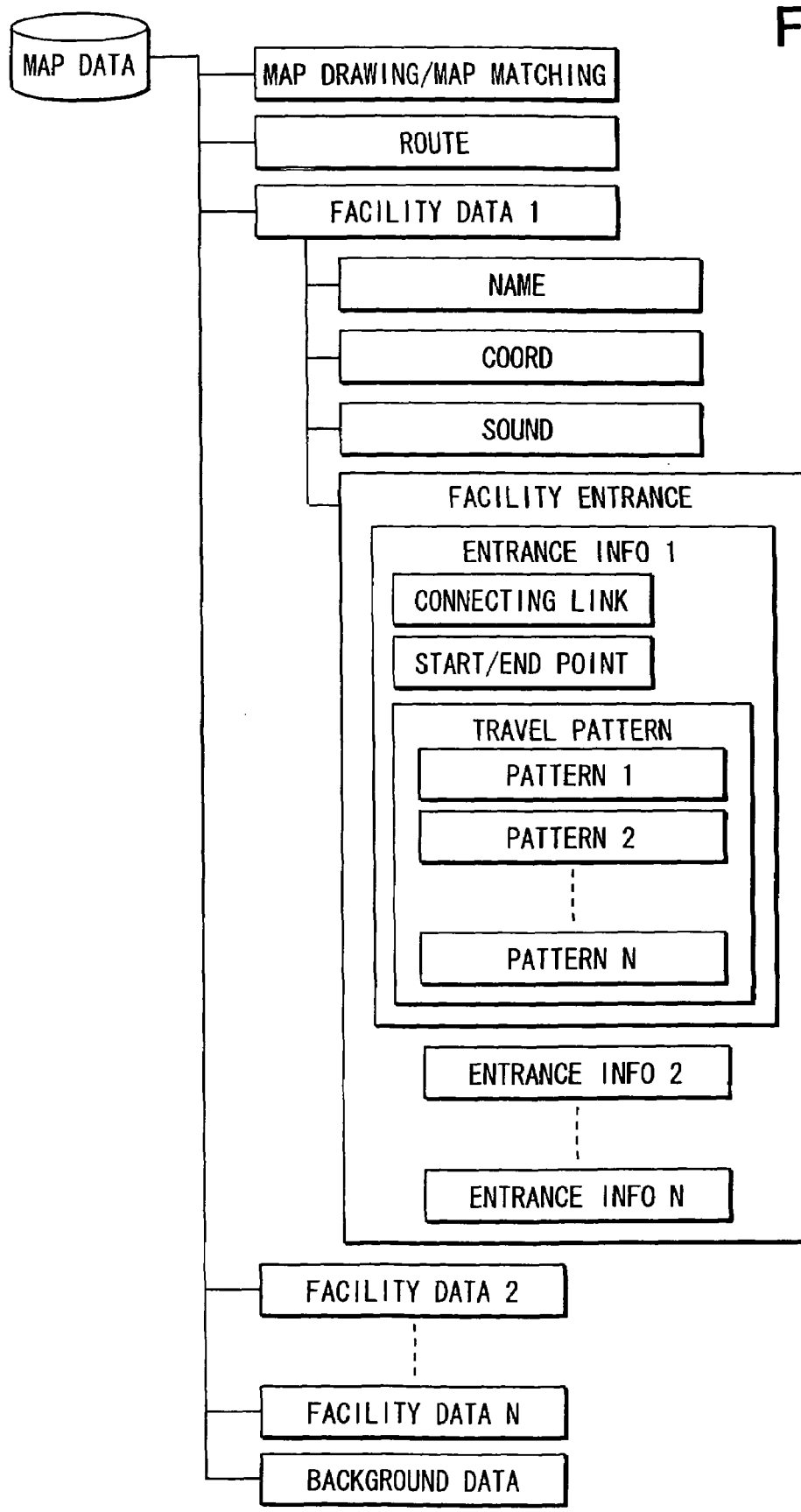
FIG. 2 shows a data structure of map data used in the navigation apparatus in the embodiment.

The map data input unit 4 accepts recording media such as a CD-ROM, a DVD-ROM, a memory card, a hard disk drive (HDD) or the like, and inputs map data from the recording media. The map data is structured, as shown in FIG. 2, from data elements such as data for map drawing/map matching, route calculation data, facility information data and background data. Among the data, the facility data is a record for each of the facilities, and the facility data includes facility name data expressing the name of the facility, coordinate (X, Y) data expressing the position (a coordinate) of the facility, audio data expressing speech information about the facility, facility entrance information data consisting of a group of plural entries of facility entrance information data. The facility entrance information data consists of data entries of a connecting link ID to express the ID of a link connected to the facility, start-end coordinate data to express a border area of the facility relative to the connecting link, and a group of plural entrance travel patterns including plural entries of travel patterns at the time of entrance into the facility.

Figure 3:
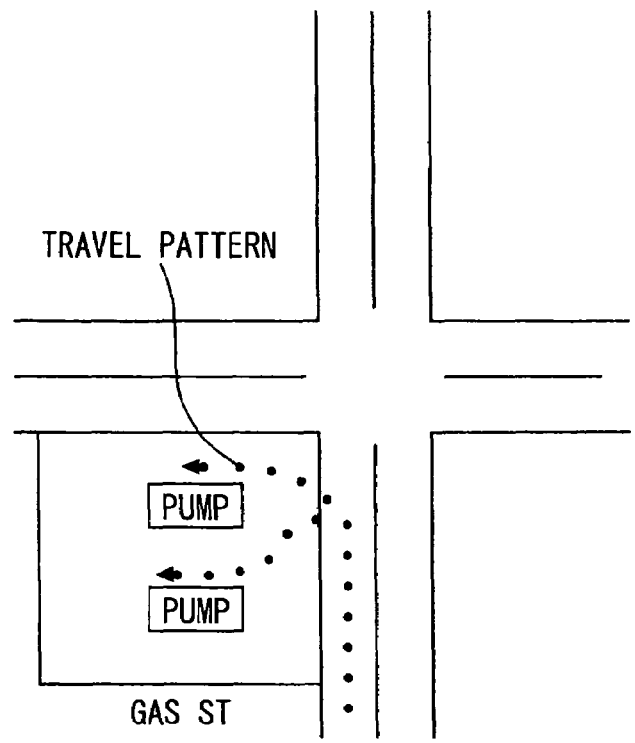
FIG. 3 shows a travel pattern of a vehicle when the vehicle enters a facility.
Figure 4:
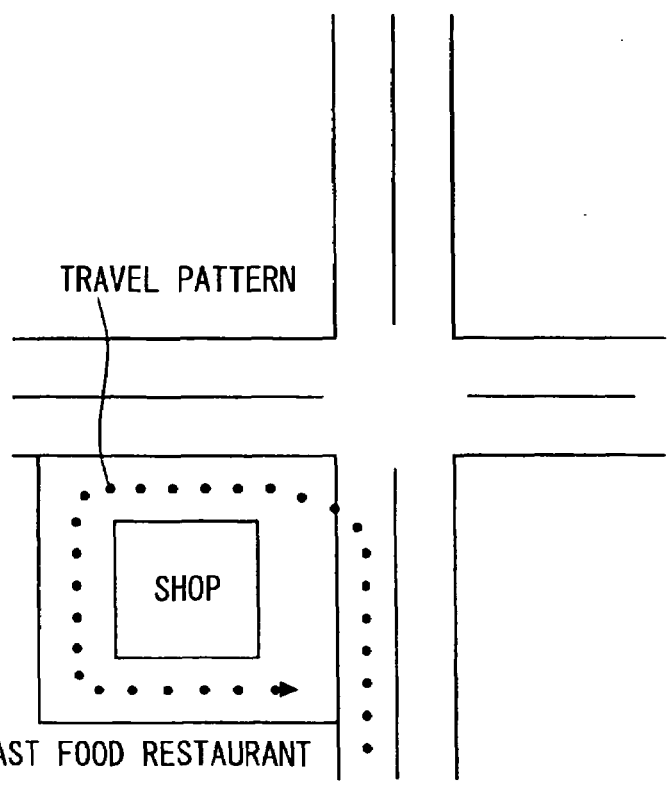
FIG. 4 shows another travel pattern of the vehicle when the vehicle enters a different facility.
Figure 5:
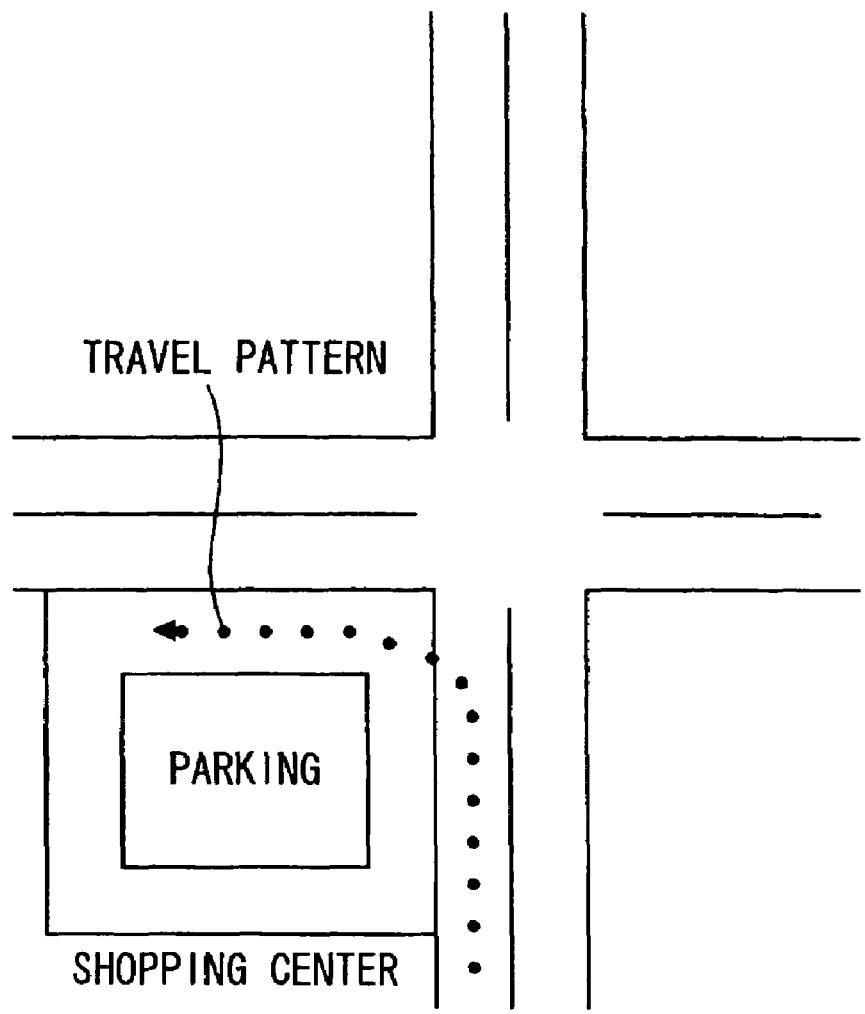
FIG. 5 shows yet another travel pattern of the vehicle when the vehicle enters a different facility.

An entrance travel pattern is a possible travel pattern of the vehicle when the vehicle enters the facility. More practically, for example, the pattern represents a travel of the vehicle along a pump when the facility is a gas station as shown in FIG. 3, or the pattern represents a travel of the vehicle along a shop building for buying the product without getting off the vehicle, which is known as a drive-through shop, when the facility is a fast food restaurant as shown in FIG. 4. Further, if the facility is a shopping center, the pattern represents a travel of the vehicle that goes around a parking area. That is, in other words, the entrance information data is prepared for each of the connecting link of the facility, and the entrance travel pattern is prepared for each of possible travel routes of the vehicle when the vehicle enters the facility.

The external memory 5 memorizes various memory information. The external information input unit 6 receives VICS (a registered trademark in JAPAN) information (i.e., traffic information) through a communications network from a center device. The wireless remote controller sensor 7 outputs an operation signal received from the wireless remote controller 12 to the control unit 2. The communications unit 8 controls communication operation. The operation switch group 9 consists of a mechanical switch arranged around the display unit 10 and a touch switch formed on the display unit 10, and detects operation contents (for example, menu browse selection, destination setting, path finding, a route guidance start, a display screen change, volume adjustment and the like) which, for example, a driver performs for outputting them to the control unit 2.

The display unit 10 is, for example, made from a color liquid crystal display, and displays various display screens such as menu browse selection screens as well as a current position mark representing a current position of the vehicle and the vehicle travel locus expressing on the map drawn by using map data. In addition, the display unit 10 may consist of an organic electroluminescence or a plasma display.

The control unit 2 mentioned above determines a start/end of the turning by the vehicle travel locus detected based on a detecting signal input from each component of the position sensor 3. Then, a current vehicle position is shifted onto a link that matches the current vehicle position concerned by the control unit 2 if the matching link is found within a predetermined tolerance range from the vehicle travel locus after searching the link based on the map data input from the media through the map data input unit 4. The above-described control is performed when the end of the turn is detected subsequently after the start of the turn. In addition, the predetermined tolerance range is defined as a field around the vehicle in a front/rear/right/left direction.

Figure 6:
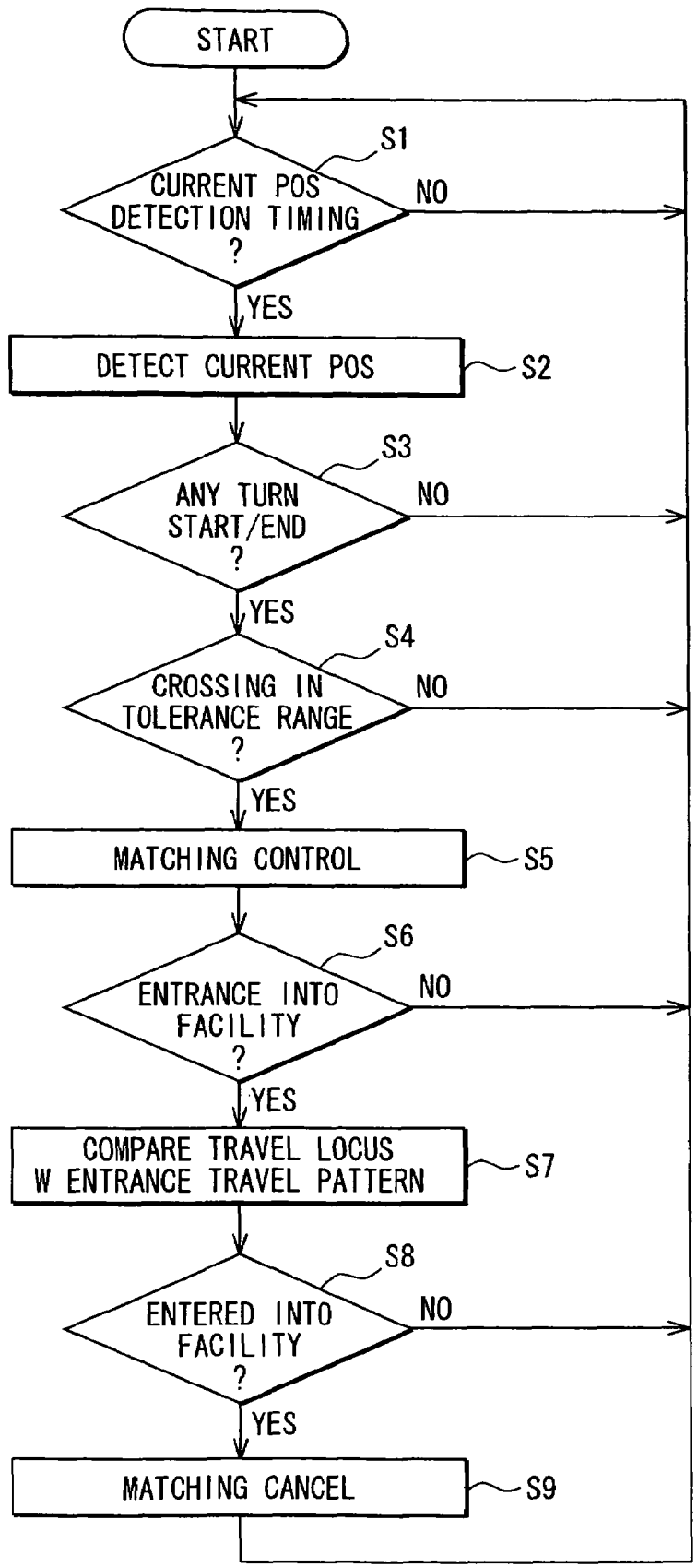
FIG. 6 shows a flow chart of a process that is performed by the navigation apparatus.

A flow chart as shown in FIG. 6 is used to describe how the above navigation apparatus works. The navigation apparatus 1 watches, by using the control unit 2, whether a timing for detecting a current vehicle position has arrived (step S1), and upon determining that the timing for detecting the current vehicle position has arrived (step S1, YES), the apparatus 1 detects the current vehicle position based on detection signals input from each of the components of the position sensor 3 (step S2). Subsequently, the control unit 2 determines whether or not the turn is started and ended, that is, whether the vehicle has turned to the right or to the left (step S3). When it is determined that the turn of the vehicle has been started and ended (step S3, YES), it is determined whether there is a crossing in a tolerance range prescribed beforehand around the current vehicle position (step S4).

Subsequently, when the control unit 2 determines that there is a crossing within the tolerance range, that is, when the control unit 2 determines that the vehicle has turned to the right or to the left (step S4, YES), the control unit 2 shifts the current vehicle position onto the matching link that suitably matches with the current vehicle position after searching a suitable link within the tolerance range from the vehicle travel locus based on the map data input from the recording media through the map data input unit 4 (step S5).

Then, in the present embodiment, the control unit 2, referring to facility entrance information data included in the map data which the map data input unit 4 has input from the recording media, determines whether there is a possibility that the vehicle has entered a facility (step S6). When the control unit 2 has determined that there is no possibility that the vehicle has entered the facility (step S6, NO), the process returns to step S1 that is mentioned above. When the control unit 2 has determined that there is a possibility that the vehicle has entered the facility (step S6, YES), the control unit 2 compares the entrance travel pattern with the vehicle travel locus (step S7) for determining whether the vehicle has entered the facility (step S8).

Then, if matching degree between the vehicle travel locus and the entrance travel pattern is low, the control unit 2 determines that the vehicle has not entered the facility (step S8, NO), and the process returns to step S1. On the other hand, the control unit 2 determines that the vehicle has entered the facility (step S8, YES), and returns the current vehicle position to the pre-matching position that is the current vehicle position to a vehicle position immediately before performing the matching control (i.e., cancels the matching control) (step S9).

Figure 7:
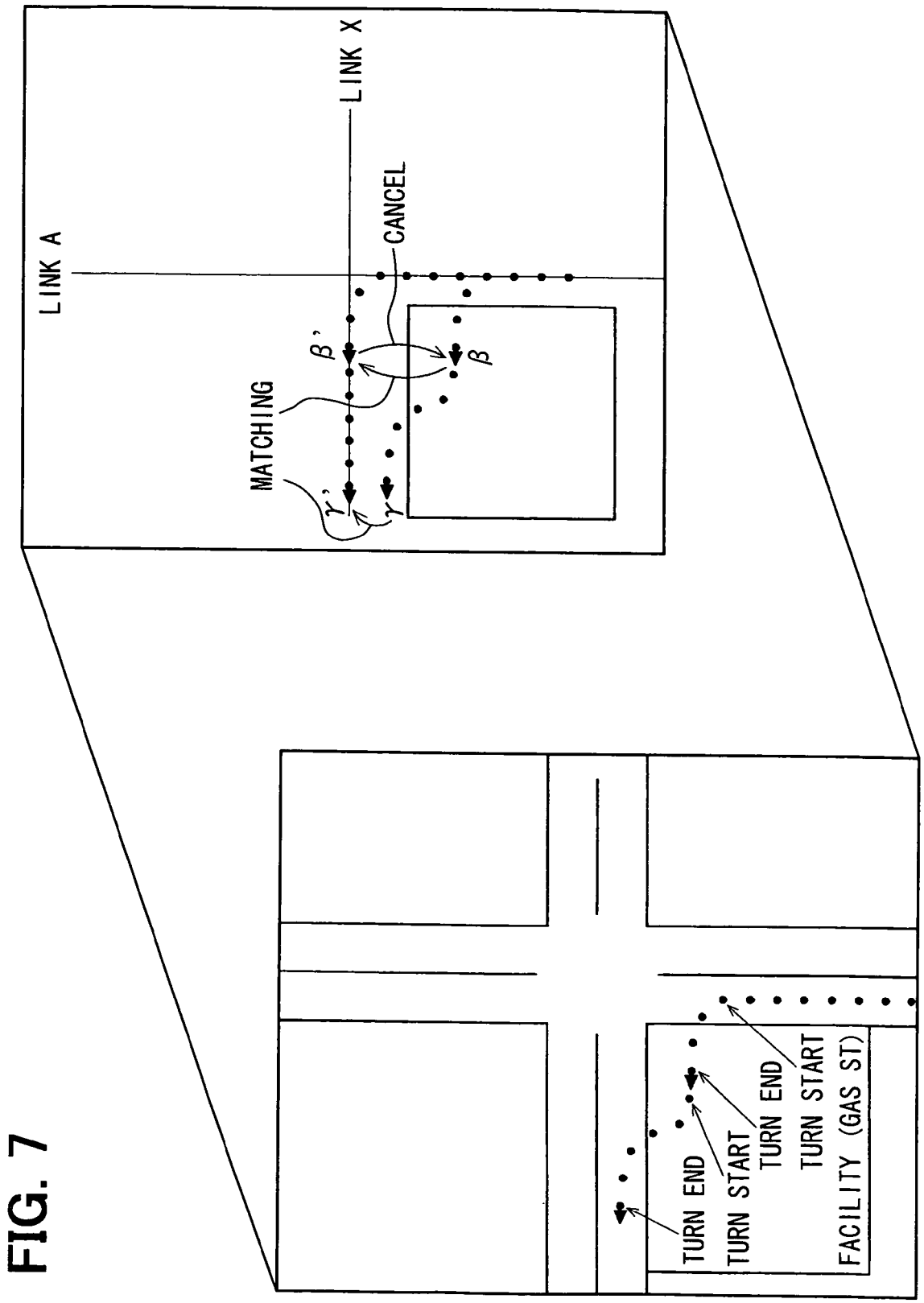
FIG. 7 shows an illustration of cancellation of a matching control of a current vehicle position onto a link.
Figure 8:
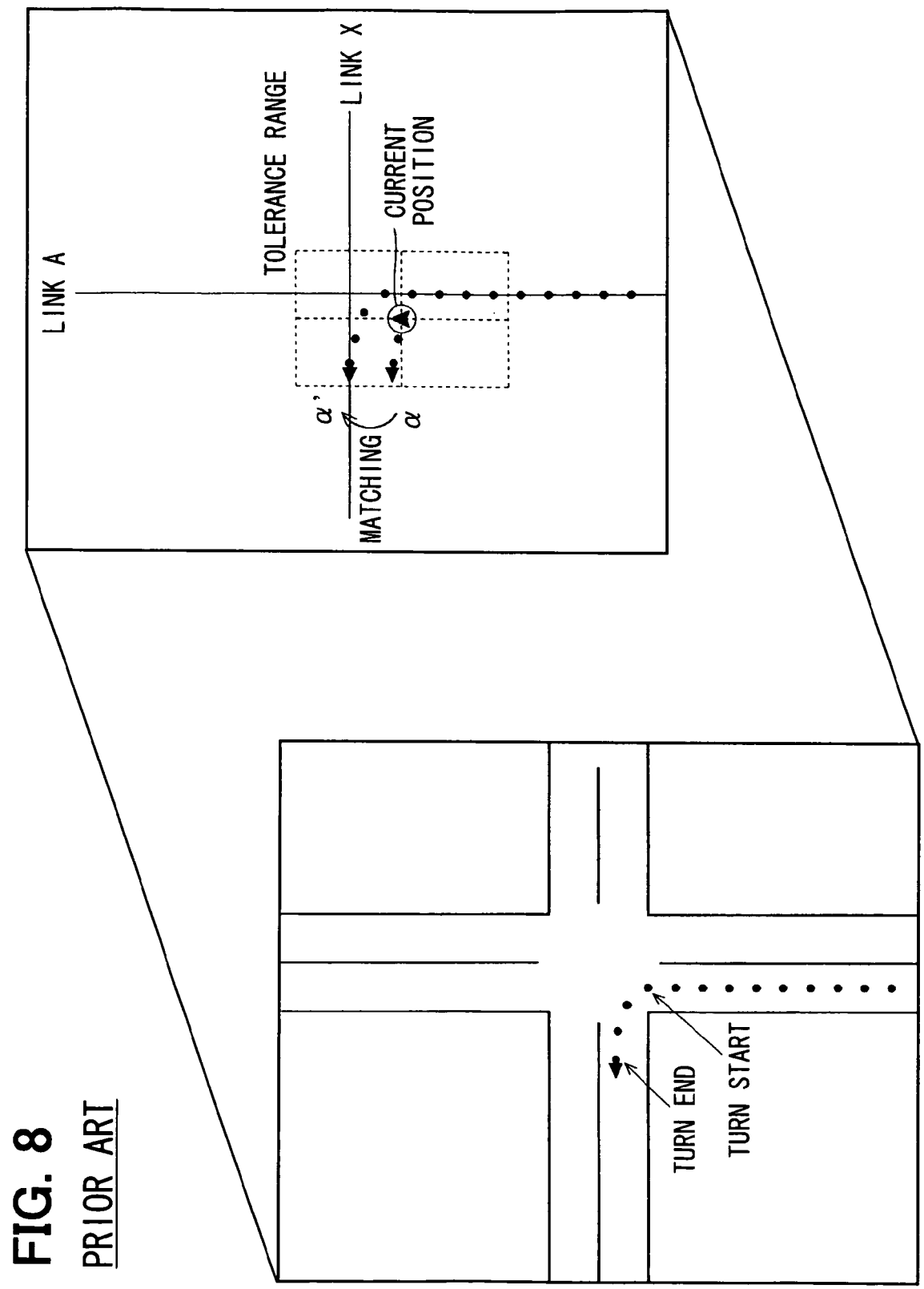
FIG. 8 shows an illustration of the matching control of the vehicle position in a conventional method.
Figure 9:
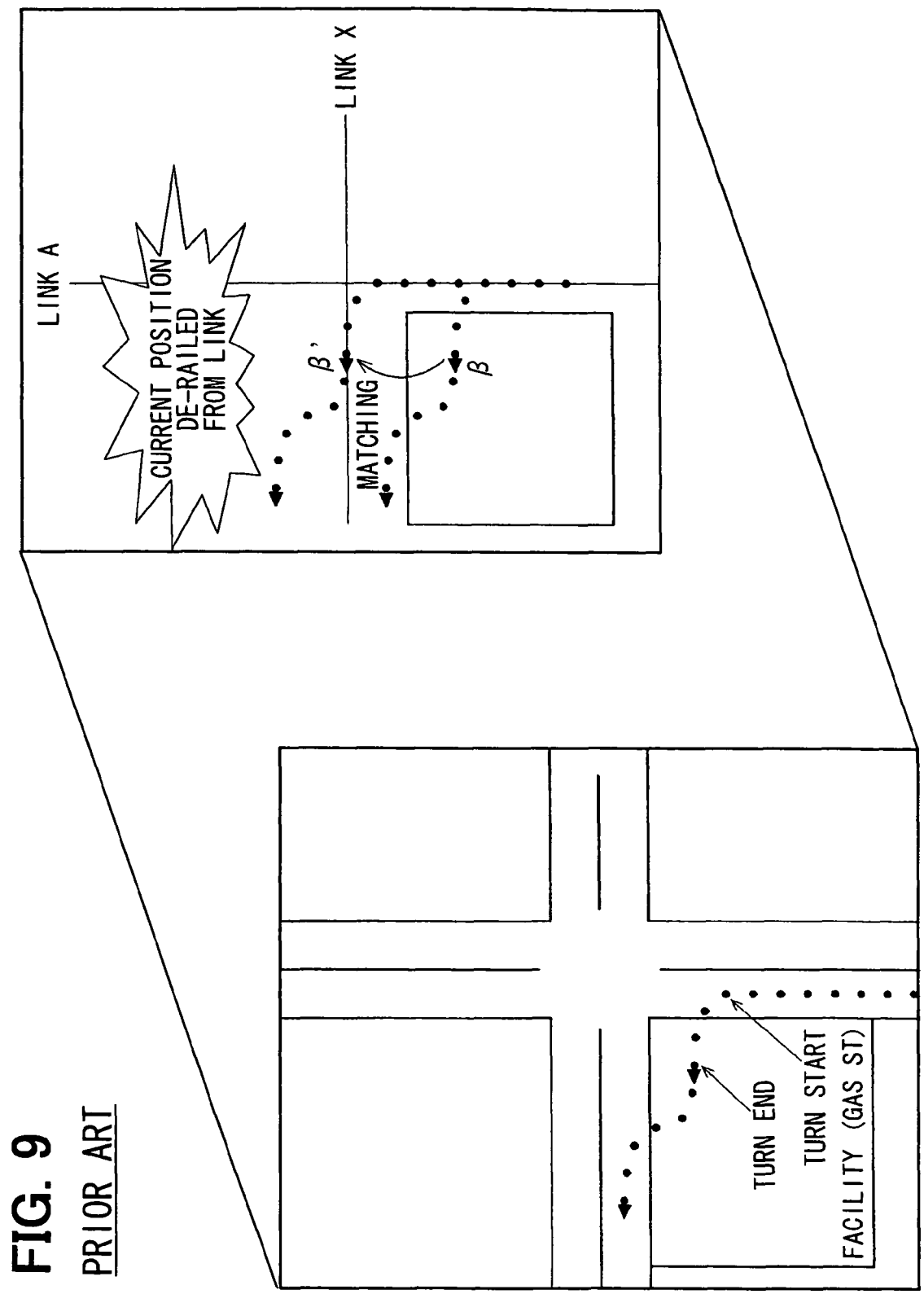
FIG. 9 shows another illustration of the matching control of the vehicle position in another conventional method.

In other words, as shown in FIG. 7, the control unit 2 performs the matching control that matches the current vehicle position onto the suitable link (a position β in FIG. 7 is shifted to a position β'). However, when it is determined that the vehicle has entered the facility, the current vehicle position is returned to the pre-matching position (the position β' is returned to the position β in FIG. 7). Therefore, after the returning operation, when a turn start and a turn end of the vehicle are performed during an exit of the vehicle from the facility, a matching link that matches the vehicle travel locus within the tolerance range is searched, and the current vehicle position is matches to the matching link (matching control is performed to match a position γ to a position γ' in FIG. 7) when the matching link is found (when a link X in FIG. 7 is found). That is, the current vehicle position is displayed on the road without "de-railing" from the road.

The characteristics of the present invention are summarized in the following manner. That is, upon detecting the turn of the vehicle, the matching link is searched within the tolerance range, and the current position of the vehicle is matched shiftingly to the suitable link based on the map data. Then, the current vehicle position is returned to the pre-matching position on a condition that the vehicle is determined to have entered the facility. Therefore, the subsequent processing after returning the current position to the pre-matching position on the link can be performed in an accurate manner because a reference point stands on a link. That is, the current vehicle position can be displayed accurately. Further, the above advantage can be achieved without having an imaging device or the like that leads to the cost increase.

In addition, even when the facility is linked to plural connecting links and the vehicle enters the facility from any one of the plural connecting links, the travel pattern of the vehicle can be correctly handled due to the configuration that the entrance travel patterns from each of the connecting links are input from the recording media. Further, each of the plural travel patterns after entrance of the vehicle into the facility can be handled correctly because the plural entrance travel patterns from the same connecting link are configured to be input from the recording media.

Furthermore, the existing matching control needs not be modified for adding the return control for returning the after-matching vehicle position to the pre-matching position, because the subsequent process is performed after returning the after-returning position to the pre-matching position when it is determined that the vehicle has entered into the facility subsequently to the matching control of the current vehicle position to the matching link.

Although the present invention has been fully described in connection with the preferred embodiment thereof with reference to the accompanying drawings, it is to be noted that various changes and modifications will become apparent to those skilled in the art.

For example, the facility coordinates may be provided in three-dimensional data of (X, Y, Z) instead of the two-dimensional data of (X, Y). In this manner, the facility such as a parking building having the height dimension can be handled correctly.

Further, the navigation apparatus 1 having the speed sensor 3a disposed outside of the vehicle may utilize the sensor signal from the speed sensor 3a input through a vehicle LAN.

Such changes and modifications are to be understood as being within the scope of the present invention as defined by the appended claims.

What is claimed is:

1. A vehicle navigation apparatus comprising:
    a current position detector for detecting a current vehicle position;
    a travel locus calculator for calculating a vehicle travel locus based on the detected current vehicle position;
    a map data obtainer for obtaining map data that represents lay conditions of roads;
    a turn determiner for determining whether or not a vehicle has turned, wherein the turning of the vehicle determined by the turn determiner includes a turn start and a turn end;
    a map matching unit for performing matching control, wherein the matching control is performed under a trigger of determination by the turn determiner that the vehicle has made a turn that is defined by the turn start and the turn end, wherein the matching control searches a matching link for the current vehicle position detected by the current position detector within a tolerance range from the vehicle travel locus calculated by the travel locus calculator based on the map data obtained by the map data obtainer, wherein the matching controls matches the current vehicle position to a position on the matching link when the matching link is found within the tolerance range;
    an entrance pattern obtainer for obtaining an entrance travel pattern that represents a travel route of the vehicle while the vehicle is within a facility; and
    an entrance determiner for determining whether or not the vehicle has entered the facility based on a comparison of the vehicle travel locus calculated by the travel locus calculator with the entrance travel pattern obtained by the entrance pattern obtainer, wherein
    the map matching unit (i) returns, for performing subsequent processing, an after-matching current vehicle position to a pre-matching current vehicle position after matching of the current vehicle position to the matching link, when the entrance determiner determines that the vehicle has entered the facility, and (ii) does not return the after-matching current vehicle position to the pre-matching current vehicle position, when the entrance determiner does not determine that the vehicle has entered the facility.

2. The vehicle navigation apparatus of claim 1, wherein the entrance pattern obtainer is capable of obtaining the entrance travel pattern representing the entrance of the vehicle into a facility for each of all connecting links connecting to the facility.

3. The vehicle navigation apparatus of claim 1, wherein the entrance pattern obtainer is capable of obtaining plural entrance travel patterns for a same connecting link.

4. The vehicle navigation apparatus of claim 1, wherein the entrance determiner determines whether or not the vehicle has entered the facility based on a comparison of the vehicle travel locus calculated by the travel locus calculator with the entrance travel pattern obtained by the entrance pattern obtainer after matching of the current vehicle position to the matching link by the map matching unit.

5. The vehicle navigation apparatus of claim 1, wherein the facility is a gas station and the travel route represents travel along a pump.

6. The vehicle navigation apparatus of claim 1, wherein the facility is a fast food restaurant and the travel route represents travel along a drive-through of a building.

7. The vehicle navigation apparatus of claim 1, wherein the facility is a shopping center and the travel route represents traveling around a parking lot of the shopping center.

8. A method of vehicle navigation comprising:
providing a current position detector for detecting a current vehicle position;
providing a travel locus calculator for calculating a vehicle travel locus based on the detected current vehicle position;
providing a map data obtainer for obtaining map data that represents lay conditions of roads;
providing a turn determiner for determining whether or not a vehicle has turned, wherein the turning of the vehicle determined by the turn determiner includes a turn start and a turn end;
providing a map matching unit for performing matching control, wherein the matching control is performed under a trigger of determination by the turn determiner that the vehicle has made a turn that is defined by the turn start and the turn end, wherein the matching control searches a matching link for the current vehicle position detected by the current position detector within a tolerance range from the vehicle travel locus calculated by the travel locus calculator based on the map data obtained by the map data obtainer, wherein the matching controls matches the current vehicle position to a position on the matching link when the matching link is found within the tolerance range;
providing an entrance pattern obtainer for obtaining an entrance travel pattern that represents a travel route of the vehicle while the vehicle is within a facility; and
providing an entrance determiner for determining whether or not the vehicle has entered the facility based on a comparison of the vehicle travel locus calculated by the travel locus calculator with the entrance travel pattern obtained by the entrance pattern obtainer, wherein
the map matching unit (i) returns, for performing subsequent processing, an after-matching current vehicle position to a pre-matching current vehicle position after matching of the current vehicle position to the matching link, when the entrance determiner determines that the vehicle has entered the facility, and (ii) does not return the after-matching current vehicle position to the pre-matching current vehicle position, when the entrance determiner does not determine that the vehicle has entered the facility.

9. The method of claim 8, wherein the facility is a gas station and the travel route represents travel along a pump.

10. The method of claim 8, wherein the facility is a fast food restaurant and the travel route represents travel along a drive-through of a building.

11. The method of claim 8, wherein the facility is a shopping center and the travel route represents traveling around a parking lot of the shopping center.

* * * * *